United States Patent
Caro (10) Patent No.: US 9,394,208 B2
(45) Date of Patent: Jul. 19, 2016

(54) METHODS TO CONVERT MEALWORM CASTINGS TO FERTILIZER

(71) Applicant: Joseph J. Caro, Huntington Beach, CA (US)

(72) Inventor: Joseph J. Caro, Huntington Beach, CA (US)

( * ) Notice: Subject to any disclaimer, the term of this patent is extended or adjusted under 35 U.S.C. 154(b) by 0 days.

(21) Appl. No.: 14/326,826

(22) Filed: Jul. 9, 2014

(65) Prior Publication Data

US 2016/0009605 A1 Jan. 14, 2016

(51) Int. Cl.
*C05F 3/00* (2006.01)
*C05G 3/00* (2006.01)
*C05B 17/00* (2006.01)

(52) U.S. Cl.
CPC . *C05F 3/00* (2013.01); *C05B 17/00* (2013.01); *C05G 3/0064* (2013.01)

(58) Field of Classification Search
CPC ........................................................ C05F 3/00
USPC ............................................................. 71/21
See application file for complete search history.

(56) References Cited

U.S. PATENT DOCUMENTS

| | | | | |
|---|---|---|---|---|
| 4,258,719 A * | 3/1981 | Lewyn | ............... | A61B 5/02416 307/650 |
| 5,741,344 A * | 4/1998 | Warkentin | ................ | C05F 9/04 71/15 |
| 6,488,733 B2 * | 12/2002 | Kalra | ...................... | C05F 5/006 71/21 |
| 2011/0160058 A1 * | 6/2011 | Fedkenheuer | ............ | C05C 9/00 504/101 |
| 2011/0247273 A1 * | 10/2011 | Cannock | ................... | C05D 3/00 47/1.01 R |
| 2013/0019645 A1 * | 1/2013 | Crabtree | ................... | C05F 3/00 71/21 |
| 2013/0283872 A1 * | 10/2013 | Bisson | .................... | C05C 11/00 71/21 |
| 2013/0316903 A1 * | 11/2013 | Hughes | ................ | C05G 3/0094 504/102 |

FOREIGN PATENT DOCUMENTS

| | | | |
|---|---|---|---|
| CN | 10359515 | * | 9/2013 |
| WO | WO 99/55644 | * | 11/1999 |

* cited by examiner

*Primary Examiner* — Wayne Langel
(74) *Attorney, Agent, or Firm* — Morrison Foerster LLP (57) ABSTRACT

Methods to convert the light and powdery mealworm castings into a suitable fertilizer product are disclosed. The methods can include saturating the mealworm castings using an infusion process with a liquid such as water until an elevated temperature is reached. The mealworm castings can be replenished and the infusion process can be repeated until the targeted N-P-K rating is achieved. The saturated mealworm castings or mealworm cake can be dried and formed into fertilizer pellets or into a granular soil-like product. In some examples, a binding agent such as dried mashed potato extract can be added to the saturated mealworm castings. In some examples, the fertilizer excludes artificially produced chemicals, hormones, antibiotics, and steroids. In some examples, the fertilizer has an N-P-K rating of 4-3-2. In some examples, the mealworm castings are produced by mealworms fed wheat bran and raw carrots.

4 Claims, 8 Drawing Sheets

METHODS TO CONVERT MEALWORM CASTINGS TO FERTILIZER

FIELD

This relates generally to methods to convert mealworm castings to fertilizer, and in particular, methods that employ an infusion process to extract nutrients from mealworm castings.

BACKGROUND

Fertilizer is a substance that can be added to soil to improve the growth of plants. Soil may not provide the essential nutrients that a plant needs for optimum growth and production. After a plant is placed in the soil, the plant can absorb nutrients in the soil as the plant grows. As the plant absorbs nutrients in the soil, the soil can become deficient of nutrients. Fertilizer can be used to replenish the nutrients in the soil.

Some fertilizers can include ingredients such as animal compost, bone and blood meal and bat guano. These ingredients can include fungi, diseases, artificially produced chemicals, hormones, antibiotics, and/or steroids that can be absorbed by the plants or otherwise be detrimental to the plants, and can inhibit plant growth or worse, be fatal to the plants. If the plants produce vegetables or fruits, absorption of these chemicals, hormone antibiotics, and/or steroids can be harmful to individuals that consume the vegetables or fruits. Additionally, the ingredients can lead to a fertilizer with a poor amount of nutrients or N-P-K rating. An alternative source for a nutrient-rich and chemical-free fertilizer may be needed.

SUMMARY

An alternative source for a nutrient-rich and chemical-free fertilizer can be mealworm castings. While the mealworm castings can be used as a granular fertilizer, the mealworm castings can have a light and powdery composition. Due to its composition, the mealworm castings may not be suitable for commercial spreading as the mealworm castings can "flyaway" as it is being spread.

Methods to convert the light and powdery mealworm castings into a suitable fertilizer product are disclosed. The methods can include saturating the mealworm castings using an infusion process with a liquid such as water until an elevated temperature is reached. The mealworm castings can be replenished and the infusion process can be repeated until the targeted N-P-K rating is achieved. The infusion process can produce a liquid extract that can be used as a foliar spray, pest deterrent or irrigation. The saturated mealworm castings can be dried and formed into fertilizer pellets or into a granular soil-like product. In some examples, a binding agent such as dried mashed potato extract can be added to the saturated mealworm castings.

DETAILED DESCRIPTION

In the following description of examples, reference is made to the accompanying drawings in which it is shown by way of illustration specific examples that can be practiced. It is to be understood that other examples can be used and structural changes can be made without departing from the scope of the various examples.

Various techniques and process flow steps will be described in detail with reference to examples as illustrated in the accompanying drawings. In the following description, numerous specific details are set forth in order to provide a thorough understanding of one or more aspects and/or features described or referenced herein. It will be apparent, however, to one skilled in the art, that one or more aspects and/or features described or referenced herein may be practiced without some or all of these specific details. In other instances, well-known process steps and/or structures have not been described in detail in order to not obscure some of the aspects and/or features described or referenced herein.

Further, although process steps or method steps can be described in a sequential order, such processes and methods can be configured to work in any suitable order. In other words, any sequence or order of steps that can be described in the disclosure does not, in and of itself, indicate a requirement that the steps be performed in that order. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modification thereto, does not imply that the illustrated process or any of its steps are necessary to one or more of the examples, and does not imply that the illustrated process is preferred.

This relates to methods to convert mealworm castings to fertilizer. The mealworm castings fertilizer can be formed into a liquid, solid pellet or solid granular form. The mealworm castings fertilizer can have a higher N-P-K rating and strength than conventional fertilizers. Additionally, the mealworm castings fertilizer can be void of fungi, diseases, artificially produced chemicals, hormones, antibiotics, steroids, and unwanted elements.

Representative applications of methods and apparatus according to the present disclosure are described in this section. These examples are being provided solely to add context and aid in the understanding of the described examples. It will thus be apparent to one skilled in the art that the described examples may be practiced without some or all of the specific details. In other instances, well-known process steps have been described in detail in order to avoid unnecessarily obscuring the described examples. Other applications are possible, such that the following examples should not be taken as limiting.

Fertilizer is a substance that can be added to soil to improve the growth of plants. Soil may not provide the essential nutrients that a plant needs for optimum growth and production. After a plant is placed in the soil, the plant can absorb nutrients in the soil as the plant grows. As the plant absorbs nutrients in the soil, the soil can become deficient of nutrients. Fertilizer can be used to replenish the soil. Exemplary plants can include garden vegetables, citrus trees, flowers, and grass.

Plants can require six primary nutrients: carbon, hydrogen, oxygen, nitrogen, phosphorus, and potassium. Carbon, hydrogen, and oxygen can be supplied from the air and water. Nitrogen, phosphorous, and potassium can be supplied from the fertilizer. In addition to the six primary nutrients, plants can require smaller amounts of calcium, magnesium, sulfur, and micronutrients (e.g., boron, copper, and iron).

Nitrogen can affect the growth and general health of the plant. Nitrogen can help make the proteins needed in order for the plant to produce new tissues. Phosphorous can help stimulate root growth. The stimulated root growth can help improve the vitality (e.g., bright, vibrant green leaves) and increase the size of the seeds. Potassium can help with the overall general health of the plant. Potassium can help the plant make carbohydrates, which not only helps with metabolic regulation but also can help with disease resistance.

The amount or percentage of nitrogen, phosphorous and potassium in a fertilizer can be quantified by what is called the N-P-K ratio or N-P-K rating. The N-P-K rating can indicate the proportion of each macronutrient that the fertilizer contains. The first number can represent nitrogen (N), the second number can represent phosphorus (P), and the third number can represent potassium (K). For example, a fertilizer can have a N-P-K rating of 2-1-1, and a fertilizer with a N-P-K rating of 4-3-2 can have a higher strength of nitrogen, phosphorus and potassium than the fertilizer with a N-P-K rating of 2-1-1.

Figure 1A:
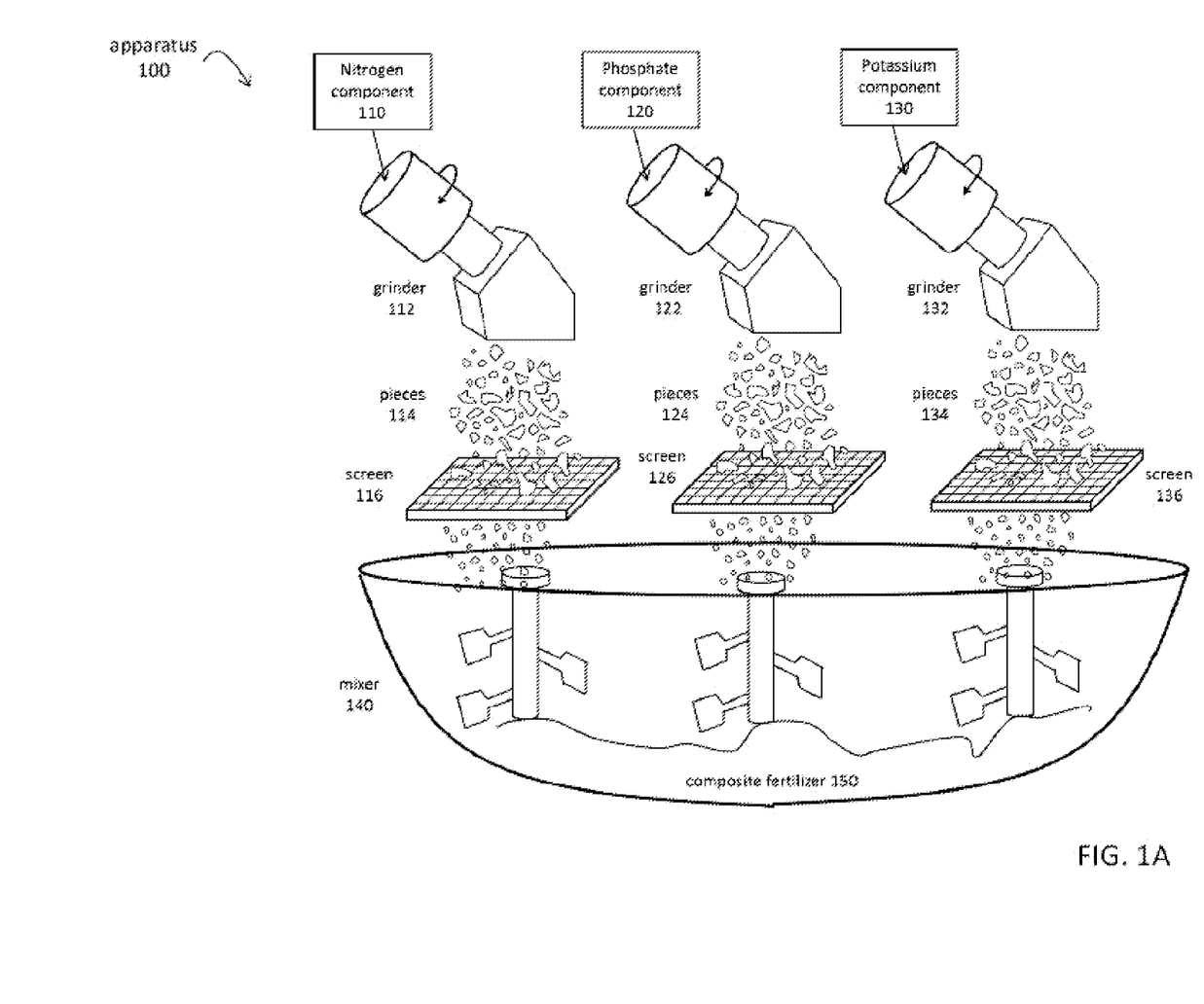
FIG. 1A illustrates an exemplary apparatus for producing a composite fertilizer in solid form.
Figure 1B:
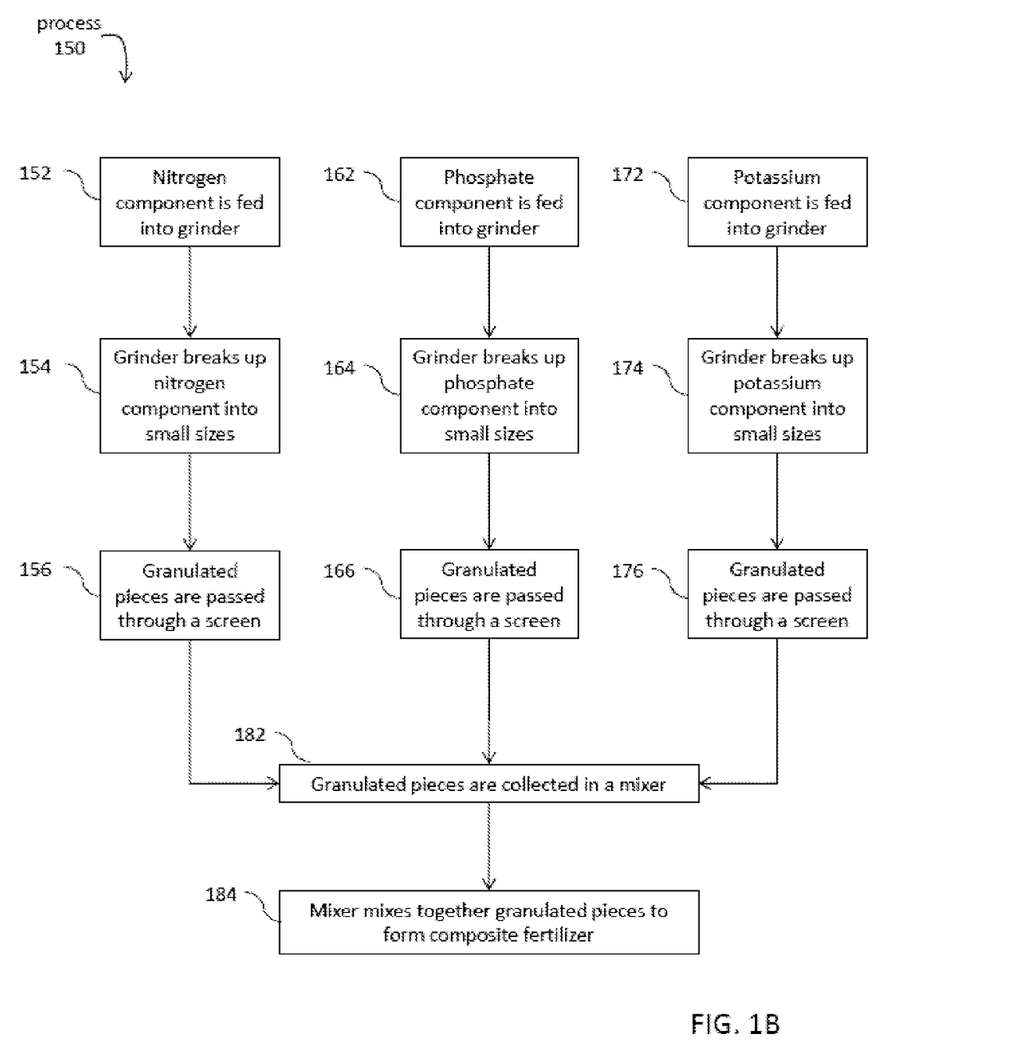
FIG. 1B illustrates an exemplary process flow for producing a composite fertilizer in solid form.

FIG. 1A illustrates an exemplary apparatus and FIG. 1B illustrates an exemplary process flow for producing a composite fertilizer in solid form. A nitrogen component 110 can be fed into grinder 112 (step 152 of process 150) of apparatus 100. Nitrogen component 110 can include, but is not limited to, anhydrous ammonia, aqua ammonia, urea, ammonium nitrate, ammonium sulfate, calcium nitrate, potassium nitrate, and sodium nitrate. Grinder 112 can be any type of apparatus that granulates the nitrogen component 110 into pieces with a small size (step 154). Grinder 112 can include a rotating drum to assist in breaking up the nitrogen component 110 into small sizes. The granulated pieces 114 can fall out of grinder 112 and can pass through a screen 116 (step 156). Screen 116 can be used to separate small pieces (i.e., pieces smaller than a certain size) and large pieces (i.e., pieces larger than a certain size). Similarly, a phosphate component 120 can be fed into grinder 122 (step 162). Phosphate component 120 can include, but is not limited to, rock phosphate, diammonium phosphate, monoammonium phosphate, and polyphosphate. Grinder 122 can break up phosphate component 120 into pieces (step 164). Granulated pieces 124 can fall out of grinder 122 and can pass through screen 126 (step 166). A potassium component 130 can be fed into grinder 132 (step 172). Potassium component 130 can include, but is not limited to, potassium chloride, potassium sulfate, potassium magnesium sulfate, potassium hydroxide, and potassium nitrate. Grinder 132 can break up potassium component 130 (step 174). Granulated pieces 134 can fall out of grinder 132 and can pass through screen 136 (step 176). A mixer 140 can be used to collect the pieces that have been separated by screens 116, 126 and 136 (step 182). The mixer 140 can mix together the pieces to form composite fertilizer 150 (step 184).

Figure 2A:
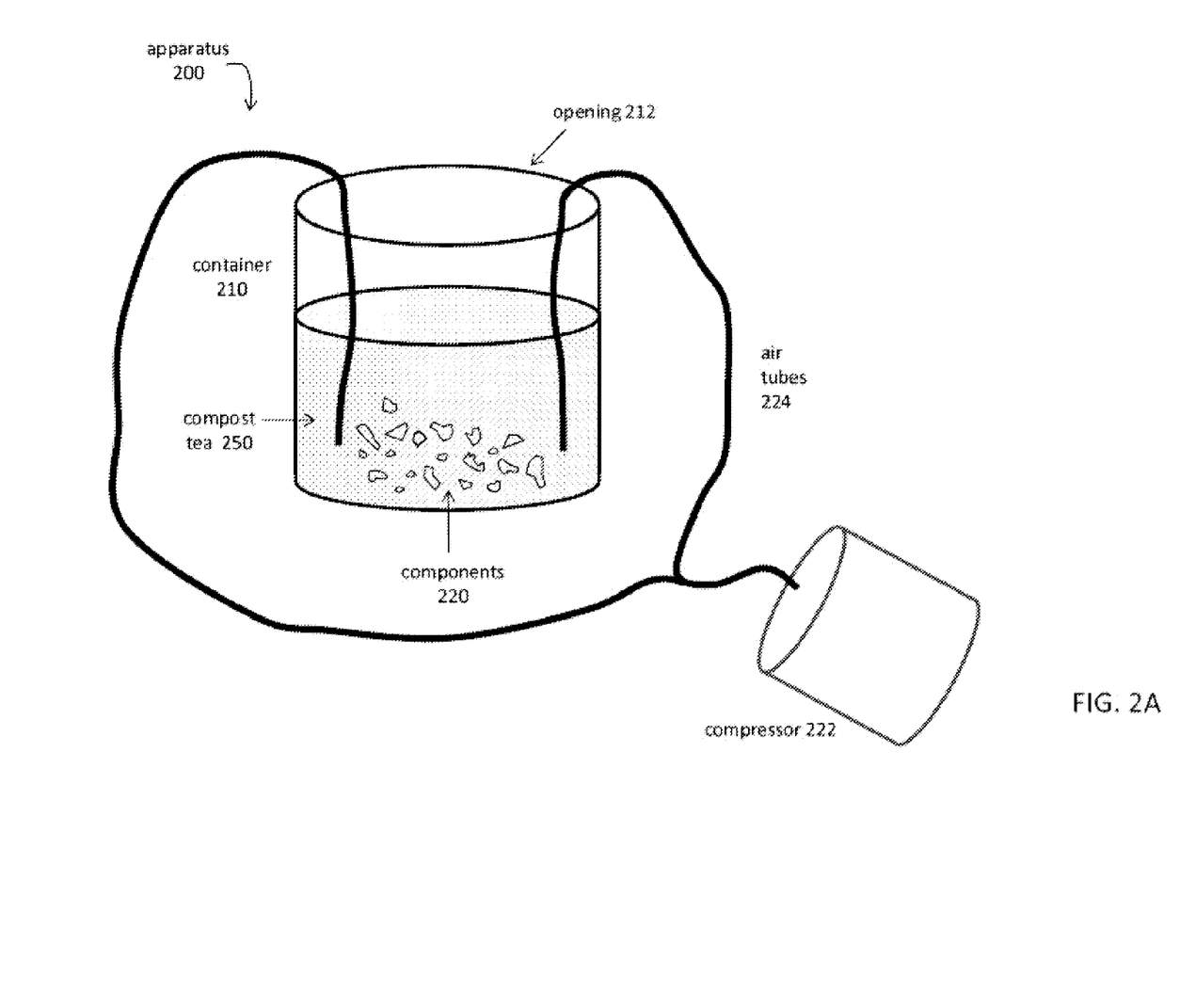
FIG. 2A illustrates an exemplary apparatus for producing a liquid fertilizer.
Figure 2B:
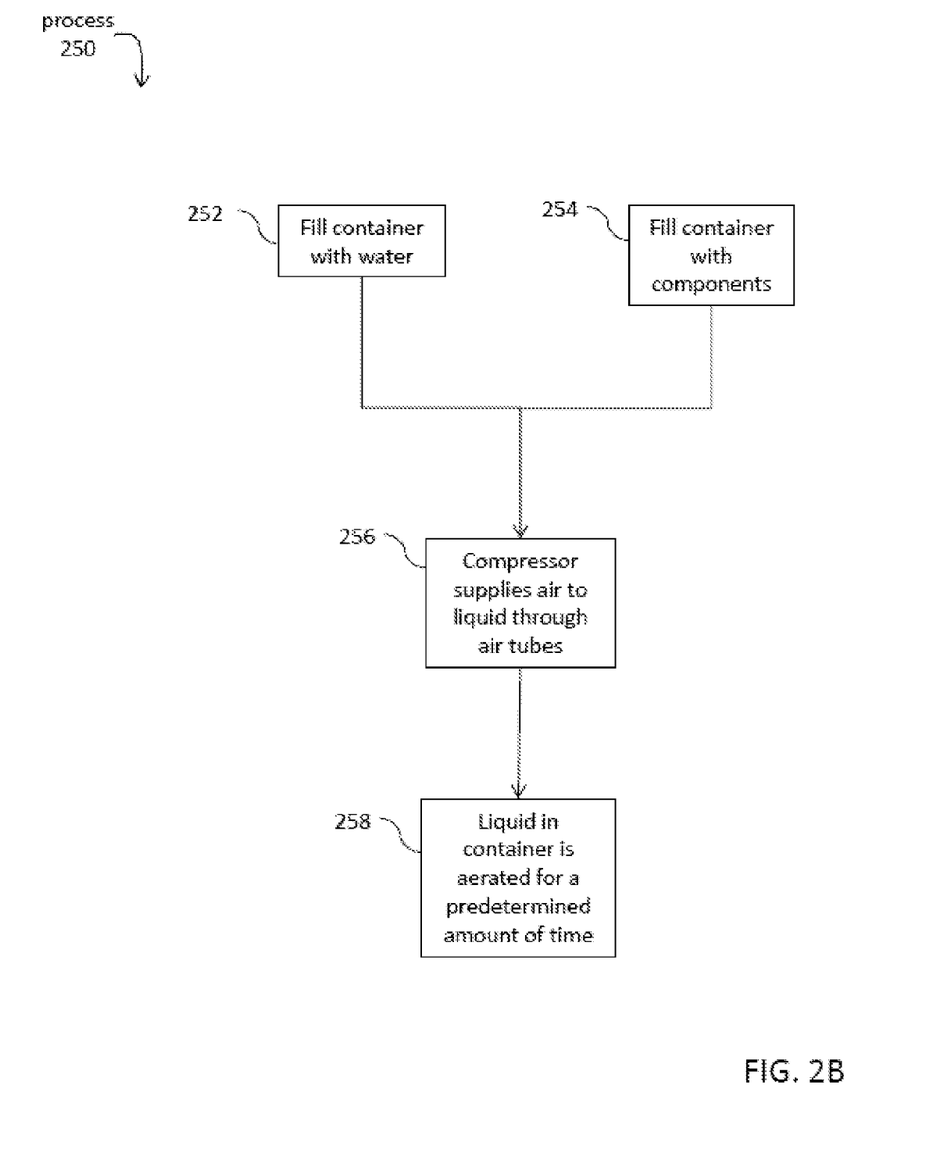
FIG. 2B illustrates an exemplary process flow for producing a liquid fertilizer.

Fertilizers can also come in liquid form. One example liquid can be a liquid fertilizer or compost tea. The compost tea can be a liquid made by steeping compost or fertilizer in water. FIG. 2A illustrates an exemplary apparatus and FIG. 2B illustrates an exemplary process flow for producing a compost tea. Apparatus 200 can include a container 210 with opening 212 located at the top of container 210. Air tubes 224 can be inserted into container 210 and can be attached to compressor 222. Compressor 222 can supply oxygen to help form the compost tea. Container 210 can be filled with a liquid such as water (step 252 of process 250). Components 220 can be added to the liquid contained in container 210 (step 254). In some examples, components 220 can be contained in a permeable bag made of any material such as muslin, hessian, or burlap. The compressor 222 can supply air through air tubes 224 to the liquid contained in container 210. The air from the compressor 222 and air tubes 224 can cause bubbles to form in the liquid from the oxygen and agitation moving through the liquid. The liquid can be aerated for a predetermined amount of time until compost tea 250 is formed. In some examples, container 210 can include a stirring mechanism, and the liquid can be stirred while the liquid is aerated.

While some fertilizers include ingredients such as animal compost, bone and blood meal and bat guano, these ingredients can include artificially produced chemicals, hormones, antibiotics, and/or steroids. An alternative ingredient used in fertilizers can be mealworm castings. The fertilizer produced using mealworm castings can be void of the artificially produced chemicals, hormones, antibiotics, and steroids. Mealworm castings can be the waste products from mealworms. A mealworm is a larva of the darkling beetle. After a female darkling beetle lays its eggs, the eggs can hatch into tiny mealworms. There are many uses for mealworms. Mealworms can be used for scientific testing and fishing bait. In some countries, mealworms can be a protein-enhanced food source. Mealworms can be a food source for wild and pet birds, pet lizards, snakes and insects such as spiders. Although there can be a wide variety of uses for mealworms, the mealworm castings or droppings are often discarded. As a result, the cost of the mealworm castings is minimal. Although mealworm castings are often discarded and the cost is minimal, the mealworm castings can be an excellent source of nitrogen, phosphorus, and potassium.

A mealworm can eat a variety of food such as leaves, sticks, grass, new plant growth, dead insects, and grains such as ground wheat, oats and corn. In some examples, to strengthen the N-P-K rating, the mealworms can be fed a diet of wheat bran and raw carrots. A diet of wheat bran and raw carrots can help the mealworms thrive and grow, can enhance the nutrient content of the mealworm castings, and also can cause the mealworm castings to be void of fungi, diseases and unwanted elements. The fertilizers comprising mealworm castings, as will be discussed below, can have a stronger N-P-K rating (e.g., an N-P-K rating of 4-3-2) than fertilizers formed using the processes illustrated in FIGS. 1A-1B and FIGS. 2A-2B. In some examples, the mealworm casting fertilizer can be void of artificially produced chemicals.

While the mealworm castings can be used as a granular fertilizer, the mealworm castings can have a light and powdery composition. Due to its composition, the mealworm castings may not be suitable for commercial spreading as the mealworm castings can "flyaway" as it is being spread. However, the mealworm castings can be converted into a suitable fertilizer that may not flyaway, as will be discussed below.

Figure 3A:
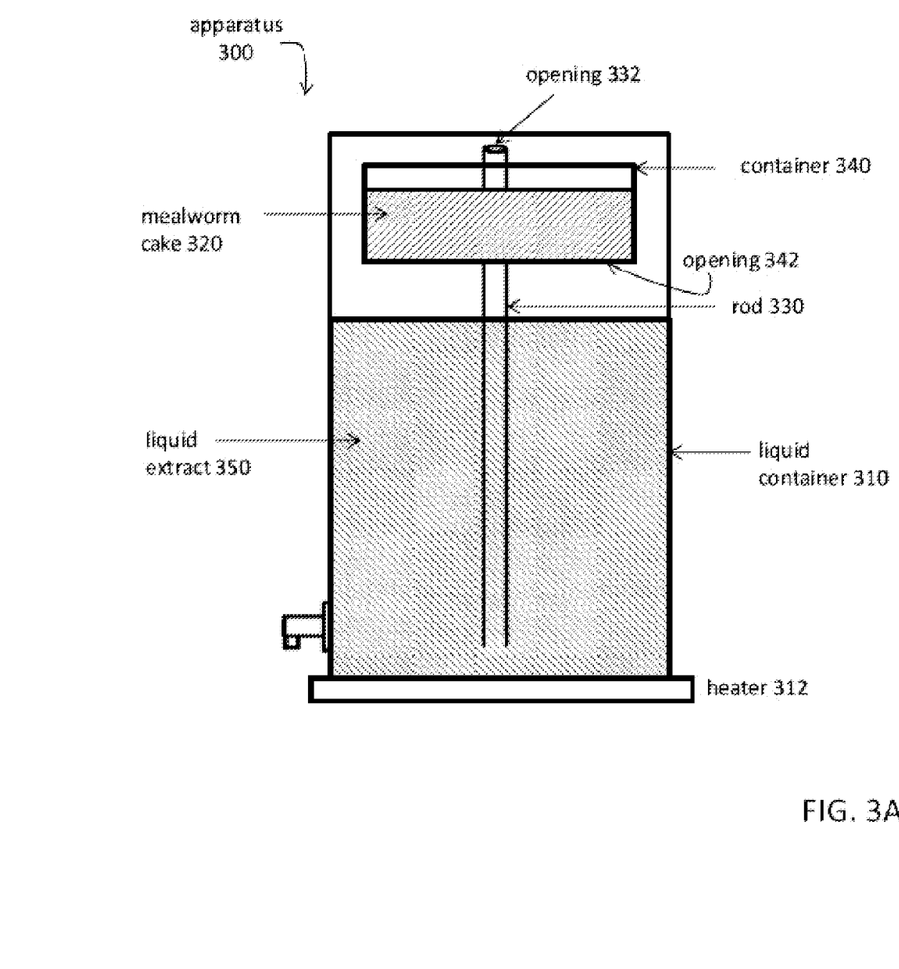
FIG. 3A illustrates exemplary apparatus for producing a liquid mealworm castings fertilizer according to examples of the disclosure.
Figure 3B:
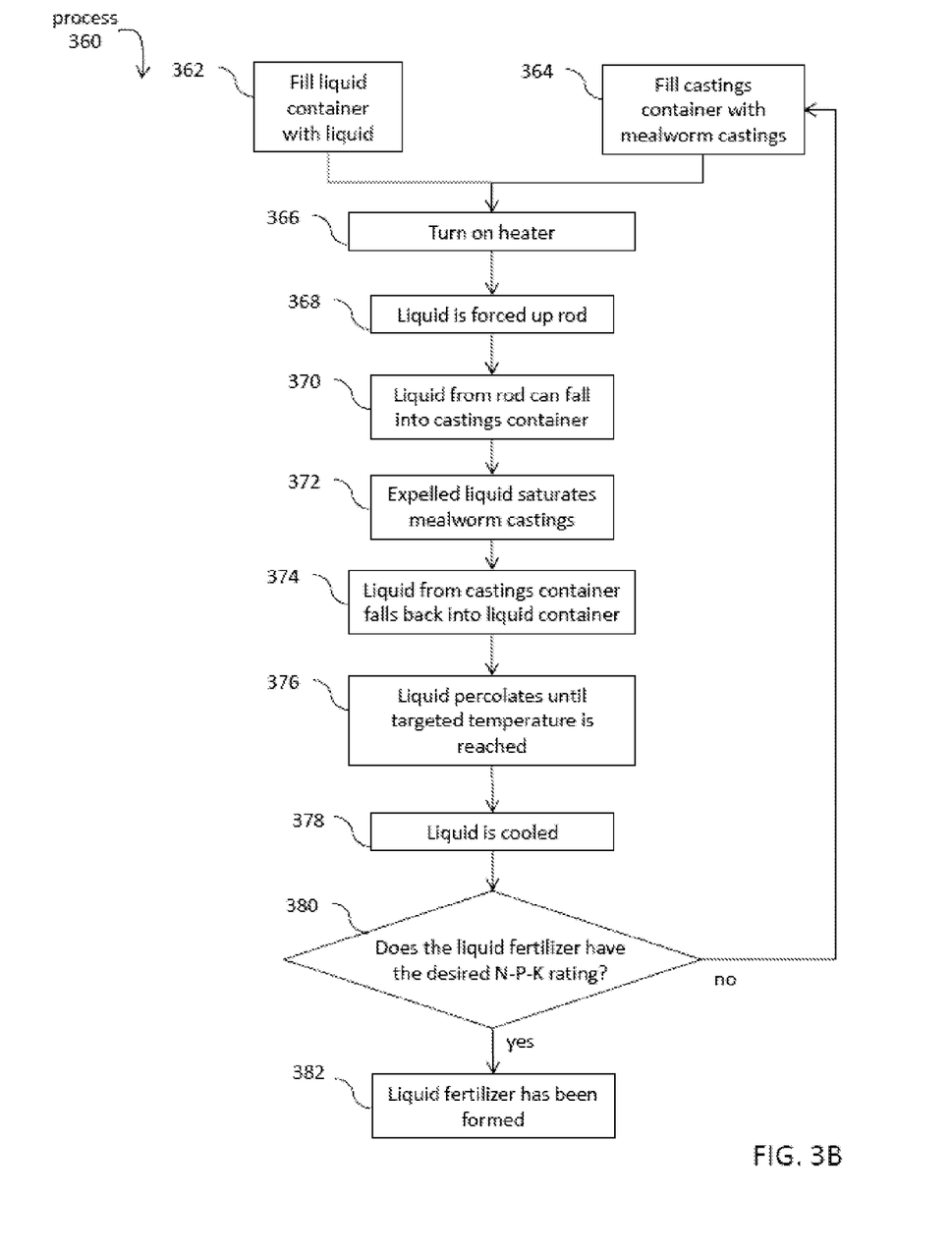
FIG. 3B illustrates an exemplary process flow for producing a liquid mealworm castings fertilizer according to examples of the disclosure.

FIG. 3A illustrates an exemplary apparatus and FIG. 3B illustrates an exemplary process flow for producing a liquid mealworm castings fertilizer according to examples of the disclosure. Apparatus 300 can include a liquid container 310 and a container 340. Liquid container 310 can be filled with a liquid such as water (step 362 of process 360). Container 340 can be filled with a byproduct substance such as mealworm cake 320 (step 364). In some examples, mealworm cake 320 can include at least one of the mealworm castings or any of the source of nitrogen, phosphorus, and potassium including, but not limited to, bone meal, blood meal and bat guano. In some examples, the N-P-K rating can be changed by altering the ratio of mealworm castings and the sources of nitrogen, phosphorus, and potassium. A heater 312 attached, touching or immersed in liquid container 310 can be turned on (step 366). Due to the elevated temperature, the liquid in liquid container 310 can be forced up the rod 330 (step 368). Rod 330 can include an opening 332 located at the top. The liquid can expel from opening 332 and can fall into container 340 (step 370). The expelled liquid can saturate the mealworm cake 320 located in container 340 (step 372). One or more openings 342 in the bottom of the container 340 can allow a liquid extract 350, which is infused with the mealworm cake 320, to drip into the liquid container 310 (step 374). Opening 342 can be any type of opening that allows liquid to pass through, but prevents the mealworm cake 320 from passing through. The liquid can be infused and can recirculate through the mealworm cake 320 until the liquid extract 350 is heated to a targeted temperature (step 376). In some examples, the targeted temperature can be below the boiling point of water to allow microbes and enzymes to remain alive. Heater 312 can be turned off, and the liquid contained in liquid container 310 can be cooled (step 378). Cooling can involve either active cooling or passive cooling. In some examples, the liquid contained in liquid container 310 can be drained to expedite the process of passive cooling. If the liquid is drained, liquid container 310 can be refilled with the cooled liquid. The process can be repeated by replacing the container 340 with "fresh" unsaturated mealworm castings (step 364). The process can be repeated until the desired N-P-K rating is achieved (step 380). Once the desired N-P-K rating is achieved, liquid fertilizer has been formed (step 382). In some examples, the process is repeated at least three times. In some examples, the process is repeated at least one time.

In some examples, liquid container 310 can be filled with three gallons of water in step 362, and container 340 can be filled with two pounds of mealworm castings. The ratio of mealworm cake 320 and liquid container 310 can be adjusted to achieve different N-P-K ratings, moisture content, and processing times. In some examples, the targeted temperature can be 185-190° F. In some examples, the targeted temperature can be 200-210° F.

In some examples, liquid fertilizer can be used in sprayers and/or drip-lines. In some examples, liquid fertilizer can be diluted with another liquid such as water and can be used as a foliar spray, pest deterrent or irrigation. For example, a ratio of liquid fertilizer to water of 3:1 can be used for a pest or mold deterrent. A ratio of liquid fertilizer to water of 4:1 can be used for a foliar spray. A ratio of liquid fertilizer to water of 10:1 can be used as an irrigation or drip-line fertilizer.

Figure 4A:
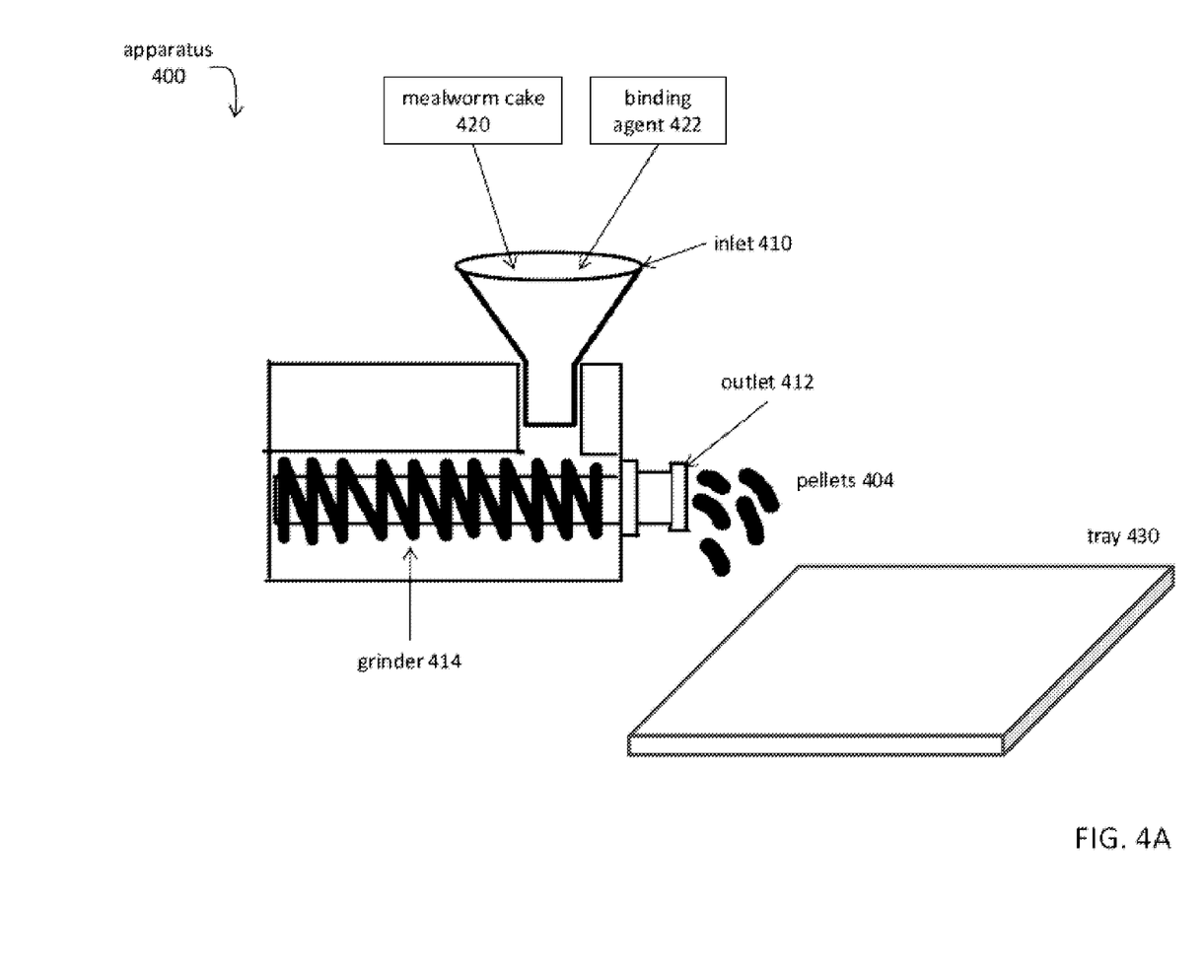
FIG. 4A illustrates an exemplary apparatus for processing a liquid mealworm castings fertilizer into pellets according to examples of the disclosure.
Figure 4B:
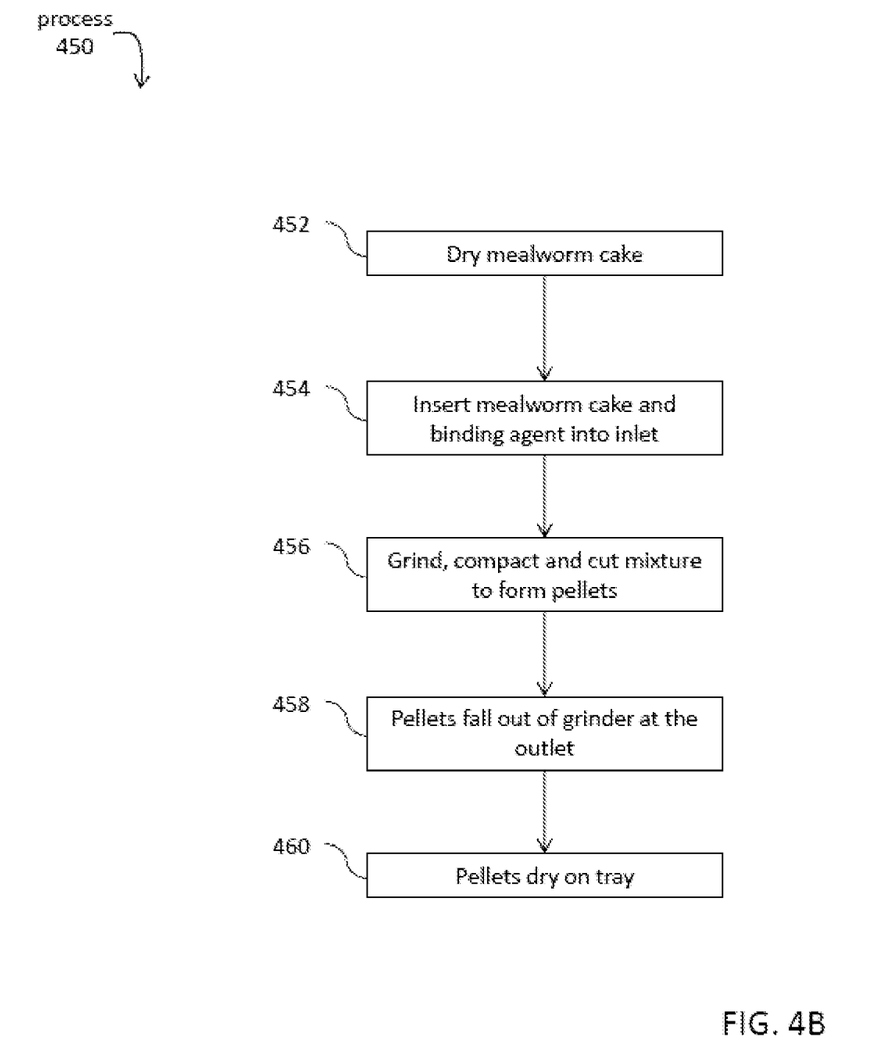
FIG. 4B illustrates an exemplary process flow for processing a liquid mealworm castings fertilizer into pellets according to examples of the disclosure.

In some examples, liquid fertilizer from the apparatus and method illustrated in FIGS. 3A-3B can be processed into pellets. FIG. 4A illustrates an exemplary apparatus and FIG. 4B illustrates an exemplary process flow for processing a mealworm castings fertilizer into pellets according to examples of the disclosure. Apparatus 400 can include an inlet 410, an outlet 412, a grinder 414, and a tray 430. Mealworm cake 320 from container 340 of FIG. 3 can be dried to remove moisture (step 452 of process 450). Mealworm cake 320 can be dried or partially-dried using any type of mechanical dryer or can be exposed to the sun. In some examples, mealworm cake 420 can be a semi-dry paste.

Mealworm cake 420 and a binding agent 422 can be inserted into inlet 410 (step 454). Binding agent 422 can be any dried substance that binds to the mealworm cake 420. Binding agent 422 can include, but is not limited to, dried mash potato extract, cornmeal, or hominy. The mealworm cake 420 and binding agent 422 can fall into grinder 414. Grinder 414 can mix the mealworm cake 420 and binding agent together, compact the mixture, and cut the compacted mixture to form pellets 404 (step 456). Grinder 414 can be, for example, a screw compactor or grinder. Pellets 404 can fall out of grinder 414 at outlet 412, and can fall (or be placed) onto tray 430 (step 458). The pellets 404 can remain on tray 430 to dry (step 460). In some examples, the pellets can be dried completely.

In some examples, the mealworm cake 320 can be broken up using a cutting device such as a slicer to form a granular soil-like product. The N-P-K rating for the granular soil-like product can be the same as the N-P-K rating for the pellets, but can dissolve faster when watered. In some examples, an apparatus similar to apparatus 400 illustrated in FIG. 4A can be used with a slicer adapter to form the granular soil-like product. In some examples, the granular soil-like product can be formed without a binding agent.

In some examples, a method of forming a fertilizer is disclosed. The method may comprise: infusing a byproduct substance by passing a liquid through the byproduct substance to form a liquid extract, wherein the liquid extract is recirculated through the byproduct substance until an elevated temperature is reached. Additionally or alternatively to one or more examples disclosed above, in other examples, the byproduct substance is mealworm castings. Additionally or alternatively to one or more examples disclosed above, in other examples, the mealworm castings are produced by mealworms fed wheat bran and raw carrots. Additionally or alternatively to one or more examples disclosed above, in other examples, the liquid is water. Additionally or alternatively to one or more examples disclosed above, in other examples, the elevated temperature is between 185-210 degrees. Additionally or alternatively to one or more examples disclosed above, in other examples, the method further comprises: replacing the byproduct substance with an unsaturated byproduct substance when the elevated temperature has been reached; and repeating the infusion process. Additionally or alternatively to one or more examples disclosed above, in other examples, the infusion process is repeated a predetermined number of times. Additionally or alternatively to one or more examples disclosed above, in other examples, the predetermined number of times is greater than or equal to 1. Additionally or alternatively to one or more examples disclosed above, in other examples, the infusion process is repeated until a N-P-K rating is achieved. Additionally or alternatively to one or more examples disclosed above, in other examples, the method further comprises cooling the liquid extract between infusion processes. Additionally or alternatively to one or more examples disclosed above, in other examples, the method further comprises: drying the byproduct substance; grinding the dried byproduct substance; compacting the ground byproduct substance; and extruding the compacted byproduct substance to form pellets. Additionally or alternatively to one or more examples disclosed above, in other examples, the method further comprises adding a binding agent to the dried byproduct substance. Additionally or alternatively to one or more examples disclosed above, in other examples, the binding agent is at least one of dried mash potato extract, cornmeal or hominy. Additionally or alternatively to one or more examples disclosed above, in other examples, the method further comprises cutting the pellets into granular form.

In some examples, a fertilizer is disclosed. The fertilizer may comprise: mealworm castings; and a binding agent. Additionally or alternatively to one or more examples disclosed above, in other examples, the fertilizer excludes artificially produced chemicals, hormones, antibiotics, and steroids. Additionally or alternatively to one or more examples disclosed above, in other examples, the fertilizer is in granular, pellet, or liquid form. Additionally or alternatively to one or more examples disclosed above, in other examples, the fertilizer has an N-P-K rating of 4-3-2. Additionally or alternatively to one or more examples disclosed above, in other examples, the binding agent is at least one of a dried mash potato extract, cornmeal or hominy. Additionally or alternatively to one or more examples disclosed above, in other examples, the mealworm castings are produced by mealworms fed wheat bran and raw carrots.

While various examples have been described above, it should be understood that they have been presented by way of example only, and not by way of limitation. Although examples have been fully described with reference to the accompanying drawings, the various diagrams can depict an example architecture or other configuration for this disclosure, which is done to aid in the understanding of the features and functionality that can be included in the disclosure. The disclosure is not restricted to the illustrated exemplary architectures or configurations, but can be implemented using a variety of alternative architectures and configurations. Additionally, although the disclosure is described above in terms of various examples and implementations, it should be understood that the various features and functionality described in one or more of the examples are not limited in their applicability to the particular example with which they are described. They instead can be applied alone or in some combination, to one or more of the other examples of the disclosure, whether or not such examples are described, whether or not such features are presented as being part of a described example. Thus, the breadth and scope of the present disclosure should not be limited by any of the above-described examples.

What is claimed is:

1. A fertilizer consisting of:
   mealworm castings; and
   a binding agent, the binding agent including at least one of a dried mash potato extract, cornmeal, or hominy,
   wherein the fertilizer is in pellet form, does not flyaway when spread, and excludes fungi, diseases, artificially produced chemicals, antibiotics, hormones, and steroids.

2. The fertilizer of claim 1, wherein the mealworm castings are produced by mealworms that exclusively consume wheat bran and raw carrots.

3. The fertilizer of claim 1, wherein the fertilizer excludes animal compost, bone meal, blood meal, and bat guano.

4. The fertilizer of claim 1, wherein the mealworm castings are produced by mealworms that exclusively consume at least one of leaves, sticks, grass, new plant growth, dead insects, or grains.

* * * * *